(12) United States Patent
Suda et al.

(10) Patent No.: US 11,110,891 B2
(45) Date of Patent: Sep. 7, 2021

(54) ONBOARD AUTHENTICATION DEVICE, AUTHENTICATION METHOD, AND STORAGE MEDIUM

(71) Applicant: HONDA MOTOR CO., LTD., Tokyo (JP)

(72) Inventors: Satoshi Suda, Wako (JP); Shinichi Ueda, Wako (JP); Masashi Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/299,189

(22) Filed: Mar. 12, 2019

(65) Prior Publication Data

US 2019/0291692 A1 Sep. 26, 2019

(30) Foreign Application Priority Data

Mar. 20, 2018 (JP) .............................. JP2018-053372

(51) Int. Cl.
*B60R 25/24* (2013.01)
*G06F 21/35* (2013.01)
(Continued)

(52) U.S. Cl.
CPC ............ *B60R 25/24* (2013.01); *B60R 25/248* (2013.01); *G06F 21/35* (2013.01); *H04L 9/0861* (2013.01);
(Continued)

(58) Field of Classification Search
CPC ........ B60R 2325/202; B60R 2325/205; B60R 25/24; G06F 21/34; G06F 16/1774;
(Continued)

(56) References Cited

U.S. PATENT DOCUMENTS 6,535,107 B1 * 3/2003 Bartz ...................... B60R 25/24
340/5.2
2006/0230284 A1 * 10/2006 Fiske ........................ G07F 7/10
713/184
(Continued)

FOREIGN PATENT DOCUMENTS

CN 1595869 3/2005
CN 101135905 3/2008
(Continued)

OTHER PUBLICATIONS

Japanese Office Action for Japanese Patent Application No. 2018-053372 dated Nov. 26, 2019.
(Continued)

*Primary Examiner* — Dionne Pendleton
(74) *Attorney, Agent, or Firm* — Amin, Turocy & Watson, LLP

(57) ABSTRACT

An onboard authentication device (60) includes: a communication unit (62) configured to receive key information; an existing electronic key determining unit (65C) configured to determine whether the key information received by the communication unit matches registered information; and an execution unit (65D, 65F) configured to execute a registration process of registering a second electronic key in the onboard authentication device or an invalidation process of invalidating the first electronic key registered in the onboard authentication device at a first time in a case that the existing electronic key determining unit determines the received key information matches the key information of the first electronic key and to execute the registration process or the invalidation process at a second time later than the first time in a case that the existing electronic key determining unit determines the received key information does not match the key information of the first electronic key.

8 Claims, 6 Drawing Sheets

(51) Int. Cl.
*H04L 9/32* (2006.01)
*H04W 4/40* (2018.01)
*H04L 9/08* (2006.01)
*H04W 12/041* (2021.01)
*G07C 9/00* (2020.01)

(52) U.S. Cl.
CPC ............ *H04L 9/3226* (2013.01); *H04W 4/40* (2018.02); *H04W 12/041* (2021.01); *B60R 2325/202* (2013.01); *B60R 2325/205* (2013.01); *G07C 2009/00769* (2013.01)

(58) Field of Classification Search
CPC .. G06F 16/1824; G06F 16/1834; G06F 21/35; G06F 21/445; G05B 2219/24167; G06Q 20/341; G06Q 20/347; G07C 9/00; G07C 9/00658; G07C 9/00706; G07C 9/00944; G07C 9/33; G07F 7/10; G07F 7/1008; G07F 7/1016; G07F 7/1075; G07F 7/1083; G07F 7/1075; G07F 7/1008; H04L 2209/38; H04L 2209/56; H04L 41/0806; H04L 41/12; H04L 45/20; H04L 61/1505; H04L 61/2069; H04L 63/0823; H04L 63/101; H04L 67/10; H04L 67/104; H04L 67/1046; H04L 67/1093; H04L 67/12; H04L 67/2809; H04L 69/18; H04L 69/22; H04L 9/0825; H04L 9/3226; H04L 9/3234; H04L 9/3239; H04L 9/3247; H04L 9/3226; H04W 12/0051; H04W 12/0052; H04W 4/08; H04W 4/70; H04W 84/18; H04W 84/22; H04W 12/69; H04W 12/76; E05B 19/0017; E05B 49/00
See application file for complete search history.

(56) References Cited

U.S. PATENT DOCUMENTS

2016/0236653 A1* 8/2016 Katou ................... H04L 9/0819
2016/0315766 A1* 10/2016 Ujiie ....................... H04L 9/083

FOREIGN PATENT DOCUMENTS

| EP | 0835790 | 4/1998 |
|----|---------|--------|
| EP | 1000825 | 5/2000 |
| EP | 1844567 A2 | 10/2007 |
| EP | 1844567 A4 | 1/2013 |
| EP | 2657917 | 10/2013 |
| JP | 10-175512 | 6/1998 |
| JP | 2013-194393 | 9/2013 |
| JP | 2013-231281 | 11/2013 |
| JP | 59-085845 | 9/2016 |
| WO | 2006/091301 | 8/2006 |

OTHER PUBLICATIONS

Chinese Office Action for Chinese Patent Application No. 201910183567.X dated Apr. 23, 2021.

* cited by examiner

131

| VEHICLE NUMBER | DEALER MAIL ADDRESS | USER MAIL ADDRESS | EXECUTION KEY |
|---|---|---|---|
| 00001005 | AAA@abc.com | BBB@abc.com | XXXXYYYY |
| ... | ... | ... | ... |
| ... | ... | ... | ... |
| ... | ... | ... | ... |

ONBOARD AUTHENTICATION DEVICE, AUTHENTICATION METHOD, AND STORAGE MEDIUM

CROSS-REFERENCE TO RELATED APPLICATION

Priority is claimed on Japanese Patent Application No. 2018-053372, filed Mar. 20, 2018, the content of which is incorporated herein by reference.

BACKGROUND

Field of the Invention

The invention relates to an onboard authentication device, an authentication method, and a storage medium.

Description Of Related Art

Recently, electronic keys have spread widely as keys to vehicles. An electronic key and a vehicle are associated with each other in advance by an immobilizer which is mounted in the vehicle. The association between a vehicle and an electronic key is performed in a dealer's shop, for example, when the vehicle is delivered to an owner or when between the electronic key is lost. A diagnostic device that is connected to an immobilizer in a wired manner is provided in a dealer's shop, and an operation mode of the immobilizer is switched to a registration mode in which the association between the vehicle and the electronic key can be carried out when necessary information is input from the diagnostic device. When the immobilizer which is operating in the registration mode receives specific key information from the electronic key, the vehicle and the electronic key are associated with each other. For example, there may be a problem in a technique (a so-called immobilizer cutter) of invalidating key information of an original qualified owner and registering new key information.

In this regard, a technique of preventing an electronic key from being rewritten by a malicious person by switching an operation mode to a registration mode in which a new electronic key is registered on the condition that a predetermined operation using a registered electronic key is performed when the electronic key is newly registered is known (for example, see Japanese Unexamined Patent Application, First Publication No. H10-175512).

SUMMARY

However, in the related art, there is a problem in that a new electronic key cannot be registered in a case that a qualified owner who has lost a registered electronic key wants to register the new electronic key.

The invention has been made in consideration of the above-mentioned circumstances and an objective thereof is to provide an onboard authentication device, an authentication method, and a storage medium, that can perform a predetermined process associated with authentication of an electronic key while maintaining security of a vehicle.

An onboard authentication device, an authentication method, and a storage medium according to the invention employ the following configurations.

(1) According to an aspect of the invention, there is provided an onboard authentication device including: a communication unit configured to receive key information from an electronic key; an existing electronic key determining unit configured to determine whether the key information received by the communication unit matches key information of a first electronic key registered already in association with a vehicle; and an execution unit configured to execute a registration process of registering a second electronic key in the onboard authentication device or an invalidation process of invalidating the first electronic key registered in the onboard authentication device at a first time in a case that the existing electronic key determining unit determines that the received key information matches the key information of the first electronic key and to execute the registration process or the invalidation process at a second time later than the first time in a case that the existing electronic key determining unit determines that the received key information does not match the key information of the first electronic key.

(2). In the aspect of (1), the onboard authentication device may further include a connection unit configured to be connected to an external device, the existing electronic key determining unit may be configured to determine whether information input from the external device connected to the connection unit matches electronic key identification information which is stored in a storage device provided in the vehicle and which is identification information of the first electronic key which is different from the key information in a case that the communication unit does not receive key information within a predetermined period, and the execution unit may be configured to execute the registration process or the invalidation process at the first time in a case that the existing electronic key determining unit determines that the information input from the external device matches the electronic key identification information and to execute the registration process or the invalidation process at the second time in a case that the existing electronic key determining unit determines that the information input from the external device does not match the electronic key identification information.

(3) According to another aspect of the invention, there is provided an onboard authentication device including: a connection unit configured to be connected to an external device; an existing electronic key determining unit configured to determine whether information input from the external device connected to the connection unit matches electronic key identification information which is stored in a storage device provided in a vehicle and which is identification information of a first electronic key which is different from key information of the first electronic key registered already in an onboard authentication information in association with the vehicle; and an execution unit configured to execute a registration process of registering a second electronic key in the onboard authentication device or an invalidation process of invalidating the first electronic key registered in the onboard authentication device at a first time in a case that the existing electronic key determining unit determines, that the information input from the external device matches the electronic key identification information and to execute the registration process or the invalidation process at a second time later than the first time in a case that the existing electronic key determining unit determines that the information input from the external device does not match the electronic key identification information.

(4) In the aspect of (2) or (3), the electronic key identification information may be information which is provided to a qualified owner at the time of purchase of the first electronic key.

(5) In the aspect of any one of (1) to (4), the execution unit may be configured to execute the registration process or the invalidation process in a case that a regular execution key is acquired as an execution key for transitioning to a registration mode in which the registration process is executed or an invalidation mode in which the invalidation process is executed.

(6) According to another aspect of the invention, there is provided an authentication method which is performed by a computer mounted in a vehicle, the authentication method causing the computer including a communication unit configured to receive key information from an electronic key to perform: determining whether the key information received by the communication unit matches key information of a first electronic key registered already in association with a vehicle; and executing a registration process of registering a second electronic key in the onboard authentication device or an invalidation process of invalidating the first electronic key registered in the onboard authentication device at a first time in a case that it is determined that the received key information matches the key information of the first electronic key; and executing the registration process or the invalidation process at a second time later than the first time in a case that it is determined that the received key information does not match the key information of the first electronic key.

(7) According to another aspect of the invention, there is provided a (non-transitory computer-readable) storage medium having a program stored therein, the program causing a computer including a communication unit configured to receive key information from an electronic key to perform: determining whether the key information received by the communication unit matches key information of a first electronic key registered already in association with a vehicle; executing a registration process of registering a second electronic key in the onboard authentication device or an invalidation process of invalidating the first electronic key registered in the onboard authentication device at a first time in a case that it is determined that the received key information matches the key information of the first electronic key; and executing the registration process or the invalidation process at a second time later than the first time in a case that it is determined that the received key information does not match the key information of the first electronic key.

(8) According to another aspect of the invention, there is provided an authentication method which is performed by a computer mounted in a vehicle, the authentication method causing the computer including a connection unit configured to be connected to an external device to perform: determining whether information input from the external device connected to the connection unit matches electronic key identification information which is stored in a storage device provided in a vehicle and which is identification information of a first electronic key which is different from key information of the first electronic key registered already in an onboard authentication information in association with the vehicle; executing a registration process of registering a second electronic key in the onboard authentication device or an invalidation process of invalidating the first electronic key registered in the onboard authentication device at a first time in a case that it is determined that the information input from the external device matches the electronic key identification information; and executing the registration process or the invalidation process at a second time later than the first time in a case that it is determined that the information input from the external device does not match the electronic key identification information.

(9) According to another aspect of the invention, there is provided a (non-transitory computer-readable) storage medium having a program stored therein, the program causing a computer including a connection unit configured to be connected to an external device to perform: determining whether information input from the external device connected to the connection unit matches electronic key identification information which is stored in a storage device, provided in a vehicle and which is identification information of a first electronic key which is different from key information of the first electronic key registered already in an onboard authentication information in association with the vehicle; executing a registration process of registering a second electronic key in the onboard authentication device or an invalidation process of invalidating the first electronic key registered in the onboard authentication device at a first time in a case that it is determined that the information input from the external device matches the electronic key identification information; and executing the registration process or the invalidation process at a second time later than the first time in a case that it is determined that the information input from the external device does not match the electronic key identification information.

According to the configurations of (1) to (9), it is possible to perform a predetermined process associated with authentication of an electronic key while maintaining security of a vehicle.

DESCRIPTION OF EMBODIMENTS

Hereinafter, an onboard authentication device, an authentication method, and a storage medium according to embodiments of the invention will be described with reference to the accompanying drawings.

First Embodiment

Entire Configuration

Figure 1:
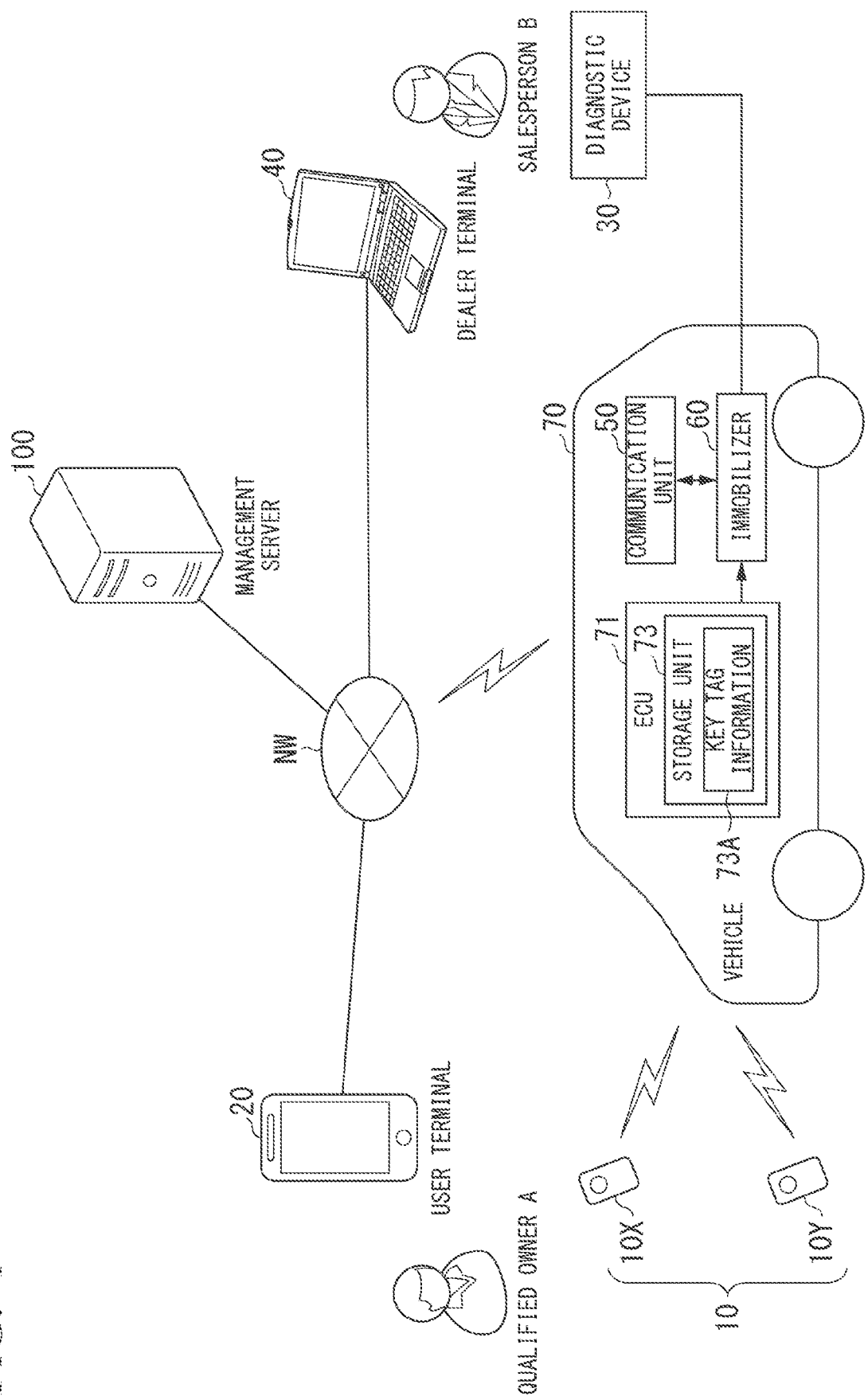
FIG. 1 is a diagram showing a configuration of an electronic key management system according to a first embodiment.

FIG. 1 is a diagram showing a configuration of an electronic key management system 1 including a vehicle authentication device according to a first embodiment. The electronic key management system 1 includes, for example, an electronic key 10, a user terminal 20, a diagnostic device 30, a dealer terminal 40, a communication unit 50, an immobilizer 60, and a management server 100. The user terminal 20, the dealer terminal 40, the communication unit 50, and the management server 100 communicate with each other via a network NW. The network NW includes a part or all of, for example, a wide area network (WAN), a local area network (LAN), the Internet, a provider device, a radio base station, and a dedicated line.

The communication unit 50 and the immobilizer 60 are mounted in a vehicle 70. The immobilizer 60 is an example of an onboard device that performs an authentication process (that is, an onboard authentication device). The onboard authentication device has only to be an onboard device that performs an authentication process and may be a device other than an immobilizer.

The vehicle 70 is, for example, a vehicle which is purchased by a qualified owner A. A registration operation and an invalidation operation of the electronic key 10 which will be described below are performed, for example, in a dealer's shop at one of the time of delivering the vehicle, the time of additional registration, and the time of cancellation of registration. The operations may be performed in the home by the qualified owner A. The time of additional registration includes a time at which a new electronic key is registered in a case that the electronic key has been lost and a time at which a second or later electronic key is registered. The time of cancellation of registration includes a time at which a registered state of a lost electronic key is cancelled. In the following description, these times are not distinguished. In the following description, it is assumed that the registration operation and the invalidation operation are performed by a salesperson B of the dealer's shop.

The electronic key 10 is an electronic key which is prepared for registration in the vehicle 70. In the electronic key 10, key information is stored in a storage unit thereof. Key information is, for example, identification information for identifying the electronic key 10. A predetermined switch is provided in the electronic key 10, and the key information stored in the storage unit of the electronic key 10 is transmitted by operating the switch. In the following description, an electronic key of which key information has been registered in the immobilizer 60 in association with the vehicle 70 is referred to as an electronic key 10X. On the other hand, an electronic key which is newly registered is referred to as an electronic key 10Y. The electronic key 10X and the electronic key 10Y are referred to as an electronic key 10 in a case that they are not distinguished from each other.

The user terminal 20 is a terminal device that is used by a qualified owner A. Examples of the user terminal 20 include a tablet terminal, a smartphone, a personal digital assistant (PDA), and a notebook PC.

The diagnostic device 30 detects a malfunction or the like of the vehicle, for example, in a state in which it is connected to the immobilizer 60 using a dedicated wired cable. The diagnostic device 30 may be connected to the immobilizer 60 indirectly via another ECU or directly. In this embodiment, the diagnostic device 30 is used as a tool for causing the immobilizer 60 to execute a predetermined mode.

The dealer terminal 40 is a terminal device that is used by a salesperson B of a dealer's shop. Examples of the dealer terminal 40 include a desktop PC installed in the dealer's shop, a notebook PC, a tablet terminal, a smartphone, and a PDA.

The communication unit 50 is, for example, a radio communication module that is connected to the network NW via a cellular network or a Wi-Fi network. The communication unit 50 is connected to the immobilizer 60 and outputs information received from an external device such as the management server 100 to the immobilizer 60.

The immobilizer 60 stores key information of an electronic key which is registered through a process of registering the electronic key 10 in a storage unit (which will be described later) and performs comparison of key information with the electronic key 10. Specifically, the immobilizer 60 compares key information registered therein with key information received from the electronic key 10 and determines whether the two pieces of key information match each other. In a case that it is determined in the determination process that the key information received from the electronic key 10 matches the key information stored in the storage unit (in a case that the electronic key 10 has been authenticated as being regular, that is, in a case that authentication has succeeded), the immobilizer 60 permits a predetermined operation such as locking or unlocking of a door of the vehicle 70 or starting of an engine of the vehicle 70. On the other hand, authentication does not succeed with key information from an electronic key 10 which has not been registered. In this case, the immobilizer 60 does not permit the predetermined operation.

An electronic control unit (ECU) 71 is mounted in the vehicle 70. The ECU 71 includes a storage unit 73. Key tag information 73A is stored in the storage unit 73. Key tag information (also referred to as electronic key identification information) is information for identifying an electronic key and is information different from key information. Key tag information is information which can be stored in a place other than the electronic key 10 and is described, for example in a key tag and is handed over to a qualified owner A along with an electronic key 10X. For example, key tag information is information which is provided to a qualified owner A at the time of purchase of the electronic key 10X. Handover of key tag information is not limited to this method and, for example, may be transmitted to the user terminal 20 by e-mail. The ECU 71 is, for example, an engine ECU and may include a brake ECU, a steering ECU, a body ECU. A dealer mail address or a user mail address is an example of an address which is used to transmit information to the dealer terminal 40 or the user terminal 20 and is not limited to a mail address as long as an execution key can be transmitted and received therethrough.

The management server 100 issues execution key which is input to the diagnostic device 30 by a salesperson B in a registration process or an invalidation process of the electronic key 10 which will be described below. An execution key is information for acquiring permission to transition to a registration mode or an invalidation mode. The registration mode is a mode in which the electronic key 10 is registered in the immobilizer 60 as an electronic key dedicated for the vehicle 70. An invalidation mode is a mode in which an electronic key registered in the immobilizer 60 as an electronic key dedicated for the vehicle 70 is invalidated. A salesperson B of a dealer's shop switches the operation mode of the immobilizer 60 to the registration mode, for example, using the execution key and then correlates the electronic key 10 with the vehicle 70. The salesperson B of the dealer's shop switches the operation mode of the immobilizer 60 to the invalidation mode, for example, using the execution key and then cancels the association between the electronic key 10 and the vehicle 70.

Diagnostic Device 30

Figure 2:
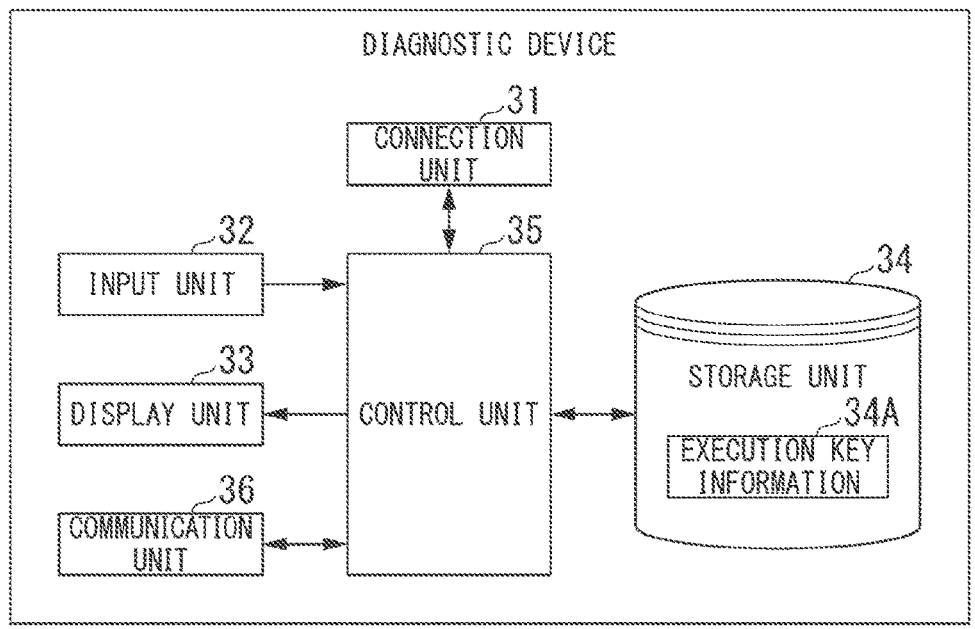
FIG. 2 is a diagram showing a configuration of a diagnostic device.

FIG. 2 is a diagram showing a configuration of the diagnostic device 30. As illustrated in FIG. 2, the diagnostic device 30 includes a connection unit 31, an input unit 32, a display unit 33, a storage unit 34, a control unit 35, and a communication unit 36. The connection unit 31 is a connector to which a wired cable is connected. The connection unit 31 is connected to the immobilizer 60 via a wired cable. The input unit 32 includes various keys and buttons. The display unit 33 is a liquid crystal display (LCD) or the like. The storage unit 34 is embodied by a random access memory (RAM), a read only memory (ROM), a flash memory, or the like. The control unit 35 communicates with the immobilizer 60, for example, on the basis of information input via the input unit 32 by a salesperson B and performs a predetermined process on the basis of information received from the immobilizer 60. The communication unit 36 is, for example, a radio communication module (a communication device) that is connected to the network NW via a cellular network or a Wi-Fi network.

Management Server 100

Figure 3:
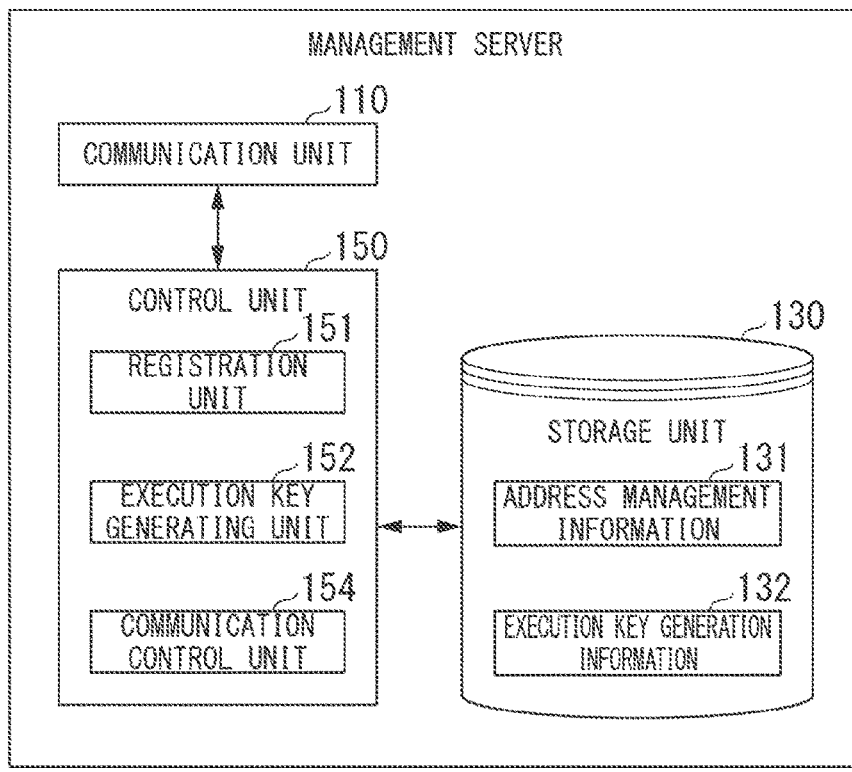
FIG. 3 is a diagram showing a configuration of a management server.

The management server 100 will be described below before the immobilizer 60. FIG. 3 is a diagram showing a configuration of the management server 100. As illustrated in FIG. 3, the management server 100 includes a communication unit 110, a storage unit 130, and a control unit 150. The communication unit 110 includes a communication interface such as a network interface card (NIC). The storage unit 130 is, for example, a RAM, a ROM, a flash memory such as a solid state drive (SSD), or a hard disk drive (HDD). The storage unit 130 stores information such as address management information 131 and execution key generation information 132. The execution key generation information 132 is information which is required for generating an execution key. For example, the execution key generation information 132 includes a computing expression or a program for deriving an execution key on the basis of input information.

Figures 4, 5:
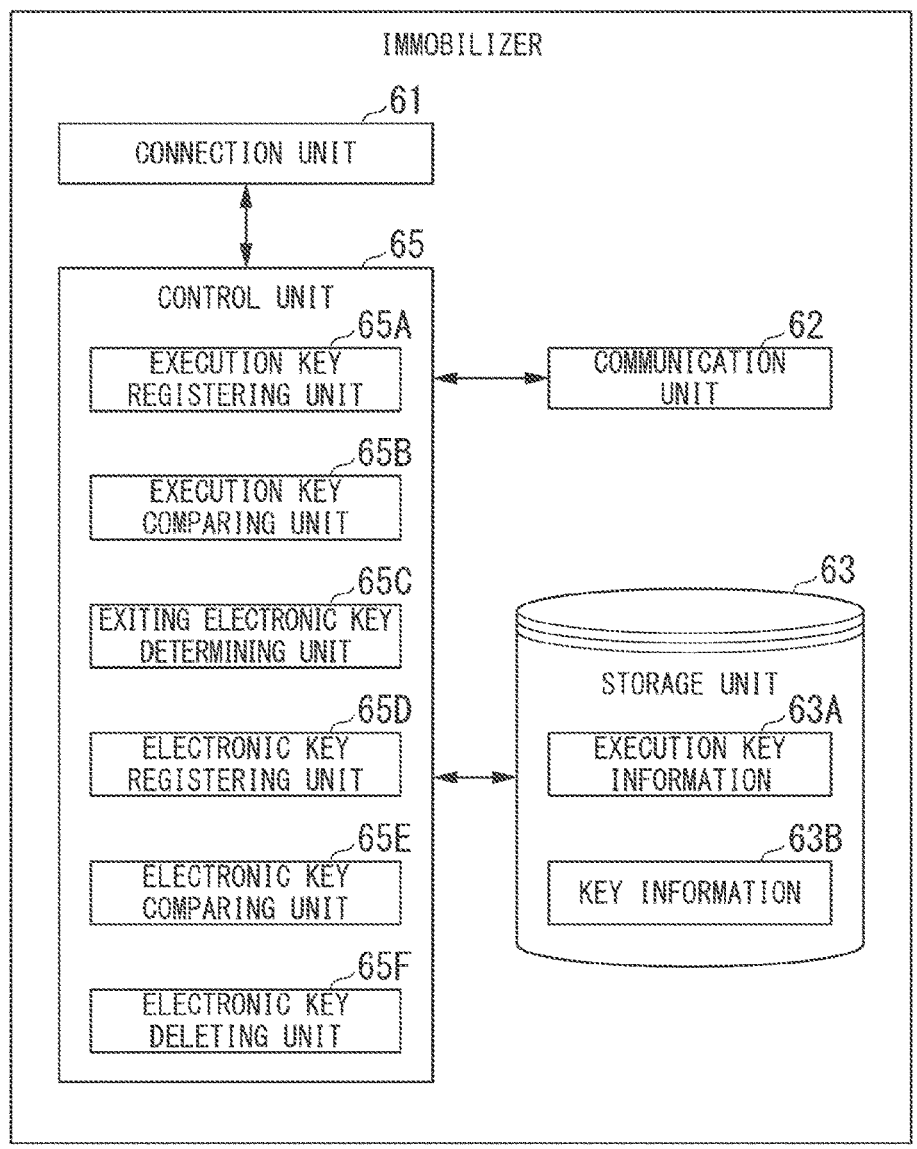
FIG. 4 is a diagram showing an example of details of address management information.
FIG. 5 is a diagram showing a configuration of an immobilizer.

FIG. 4 is a diagram showing an example of details of the address management information 131. As illustrated in FIG. 4, the address management information 131 is, for example, information in which a dealer mail address, a user mail address, and an execution key is associated with a vehicle number. The vehicle number is identification information for identifying the vehicle 70 and is, for example, a number which is marked on a number plate which has been attached (or will be attached) to the vehicle 70. The dealer mail address is a mail address with which a mail can be received by the dealer terminal 40. The user mail address is a mail address with which a mail can be received by the user terminal 20. The execution key is an execution key which is generated by the management server 100, for example, on the basis of the vehicle number.

The control unit 150 includes, for example, a registration unit 151, an execution key generating unit 152, and a communication control unit 154. These elements are embodied, for example, by causing a hardware processor such as a central processing unit (CPU) to execute a program (software). Some or all of functional units of the control unit 150 which will be described below may be embodied in hardware such as a large scale integration (LSI) circuit, an application specific integrated circuit (ASIC), or a field-programmable gate array (FPGA) or may be embodied in combination of software and hardware. A program may be stored in a storage device (a storage device including a non-transitory storage medium) such as a hard disk drive or a flash memory in advance or may be stored in a removable storage medium such as a DCD or a CD-ROM and be installed in the storage device by setting the storage medium (the non-transitory storage medium) in a drive device.

The registration unit 151 stores information in which the dealer mail address received from the dealer terminal 40 and the user mail address received from the user terminal 20 are associated with the vehicle number received from the dealer terminal 40 in the storage unit 130 as a part of the address management information 131. The mail address which is associated with the vehicle number in the address management information 131 may be any one of the dealer mail address and the user mail address.

The execution key generating unit 152 generates an execution key K using the execution key generation information 132, for example, in response to an execution request from the immobilizer 60. For example, the execution key generating unit 152 generates an execution key K, for example, on the basis of static information such as the vehicle number registered in the address management information 131 or dynamic information such as date and time information of a registration date. The execution key generating unit 152 associates the generated execution key K with the corresponding vehicle number and stores the resultant information in the address management information 131 of the storage unit 130.

The communication control unit 154 transmits the execution key K generated by the execution key generating unit 152 to the diagnostic device 30 having transmitted the execution request. Hereinafter, the execution key K which is transmitted to the diagnostic device 30 is referred to as an execution key Kd. The communication control unit 154 may transmit the execution key K generated by the execution key generating unit 152 to the immobilizer 60 having transmitted the execution request. In the following description, the execution key K which is transmitted to the immobilizer 60 is referred to as an execution key Ki. The execution keys Kd and Ki are the same information, as the execution key K.

The communication control unit 154 transmits the execution key K generated by the execution key generating unit 152 to at least one of the dealer terminal 40 and the user terminal 20. In the following description, the execution key K which is transmitted to at least one of the dealer terminal 40 and the user terminal 20 is referred to as an execution key Kt. The execution key Kt is the same information as the execution key K. The dealer terminal 40 or the user terminal 20 displays the received execution key Kt on a display unit thereof. The display unit is referred to by an operator and the execution key which is input from the diagnostic device 30 to the immobilizer 60 and which is an execution key input to the input unit 32 is referred to as an execution key Kt(m) in the following description.

Immobilizer 60

FIG. 5 is a diagram showing a configuration of the immobilizer 60. As illustrated in FIG. 5, the immobilizer 60 includes a connection unit 61, a storage unit 63, and a control unit 65. The connection unit 61 is a connector to which a wired cable is connected. The connection unit 61 is connected to the diagnostic device 30 and the communication unit 50 via a wired cable. The storage unit 63 is embodied by a RAM, a ROM, a flash memory, or the like.

Information such as execution key information 63A and key information 63B is stored in the storage unit 63. The execution key information 63A is information indicating the execution key Ki received from the management server 100. The key information 63B is identification information which is assigned to the electronic key 10 registered as an electronic key dedicated for the vehicle 70 (that is, the immobilizer 60) in the registration mode. A plurality of pieces of key information, may be included in the key information 63B. For example, key information of the electronic key 10X is included in the key information 63B.

The control unit 65 includes, for example, an execution key registering unit 65A, an execution key comparing unit 65B, an existing electronic key determining unit 65C, an electronic, key registering unit 65D, an electronic key comparing unit 65E, and an electronic key deleting unit 65F. These elements are embodied, for example, by causing a hardware processor such as a CPU to execute a program (software).

The execution key registering unit 65A transmits input information to the management server 100 in a case that an execution request of the registration mode is input from the diagnostic device 30 or in a case that an execution request for the invalidation mode is input from the diagnostic device 30. In a case that an execution key Ki is received from the management server 100, the execution key registering unit 65A stores the received execution key as the execution key information 63A in the storage unit 63.

The execution key comparing unit 65B determines whether the execution key Kt(m) input from the diagnostic device 30 to the immobilizer 60 is regular by executing a predetermined program. A random number or the like which is generated on the basis of a date or a vehicle number or the like can be used as the execution key Kt(m).

For example, the execution key comparing unit 65B compares the execution key Kt(m) (the first execution key) input from the diagnostic device 30 to the immobilizer 60 with the execution key Kd (the second execution key) input from the diagnostic device 30. The execution key comparing unit 65B determines whether the execution key Kt(m) and the execution key Kd match each other and authenticates the execution key Kt(m) input from the diagnostic device 30 to the immobilizer 60 as being regular (that is, determines that authentication has succeeded) in a case that the two execution keys match each other. On the other hand, in a case that it is determined by the comparison that the two execution keys do not match each other, the execution key comparing unit 65B does not, authenticate the execution key Kt(m) input from the diagnostic device 30 to the immobilizer 60 as being regular (that is, determines that authentication has not succeeded). Matching of keys may include various meanings that correct information is acquired in a case that information encrypted using one key is decrypted using the other key, in addition to matching or partial matching of information indicated by the keys. The same is true in the following description.

The execution key comparing unit 65B may perform the above-mentioned authentication process by comparing the execution key Kt(m) input from the diagnostic device 30 to the immobilizer 60 with the execution key Ki which is the execution key information 63A stored in the storage unit 63.

The existing electronic key determining unit 65C determines whether key information received by the communication unit 62 matches key information of an existing electronic key registered already in association with the vehicle (hereinafter referred to as key information determination). The existing electronic key determining unit 65C may determine whether information input from the diagnostic device 30 connected to the connection unit 61 matches key tag information 73A stored in the storage unit 73 of the ECU 71 (hereinafter referred to as key tag determination). In this, embodiment, it is assumed that the existing electronic key determining unit 65C performs the key tag determination in a case that the communication unit 62 has not received key information within a predetermined time. However, the invention is not limited thereto, and the existing electronic key determining unit 65C may perform any one of the key information determination and the key tag determination.

The electronic key registering unit 65D is configured to transition to the registration mode and to perform the registration process. In a case that a predetermined execution condition is satisfied, the electronic key registering unit 65D performs the registration process at a first time. The first time may be a time immediately after the execution condition has been satisfied or may be a time within a predetermined time (for example, several seconds or several minutes) after the execution condition has been satisfied. The execution condition is, for example, a condition that the execution key Kt(m) is authenticated as being regular by the execution key comparing unit 65B and the pieces of key information (or key tag information) are determined to match each other by the existing electronic key determining unit 65C. The execution condition may include only the determination which is performed by the existing electronic key determining unit 65C. For example, the electronic key registering unit 65D may not perform the authentication process based on the execution key but may perform the registration process in a case that the existing electronic key determining unit 65C determines that the pieces of key information (or key tag information) match each other.

For example, in a case that the execution key Kt(m) is authenticated as being regular by the execution key comparing unit 65B, the electronic key registering unit 65D executes the registration mode in response to an execution request for the registration mode from the diagnostic device 30. The execution request for the registration mode may be performed before the authentication or may be performed after the authentication. In a case that the pieces of key information (or key tag information) are determined to match each other by the existing electronic key determining unit 65C during execution of the registration mode, the electronic key registering unit 65D stores the key information received from the electronic key 10 in the storage unit 63 as the key information 63B and ends the registration mode. In a case that the execution condition has been satisfied, the electronic key registering unit 65D may execute the registration mode in response to the execution request for the registration mode from the diagnostic device 30.

In a case that the pieces of key information (or key tag information) are determined not to match each other by the existing electronic key determining unit 65C, the electronic key registering unit 65D executes the registration process at a second time which is later than the first time. The second time is a time at which a predetermined time (for example, several hours or a day) or more has elapsed after the existing electronic key determining unit 65C has determined that the two pieces of key information do not match each other.

In a case that the key information is received from the electronic key 10, the electronic key comparing unit 65E compares the received key information with the key information 63B in the storage unit 63. The electronic key comparing unit 65E determines whether the two pieces of key information match each other and authenticates the key information received from the electronic key 10 as being regular in a case that the two pieces of key information match each other. In a case that the key information received from the electronic key 10 is authenticated as being regular, the electronic key comparing unit 65E permits a predetermined operation such as locking or unlocking of a door of the vehicle 70 or starting of an engine of the vehicle 70. On the other hand, in a case that the two pieces of key information do not match each other, the electronic key comparing unit 65E does not authenticate the key information received from the electronic key 10 as being regular and does not permit the predetermined operation.

The electronic key deleting unit 65F is configured to transition to the invalidation mode and to execute the invalidation process. In a case that a predetermined execution condition has been satisfied, the electronic key deleting unit 65F executes the invalidation process at a first time. For example, in a case that the execution key Kt(m) has been authenticated as being regular by the execution key comparing unit 65B, the electronic key deleting unit 65F execute the invalidation mode in response to an invalidation request for the registration mode from the diagnostic device 30. The execution request for the invalidation mode may be performed before the authentication or may be performed after the authentication. In a case that the two pieces of key information (or key tag information) are determined to match each other by the existing electronic key determining unit 65C during execution of the invalidation mode, the electronic key deleting unit 65F determines whether the key information received from the electronic key 10 is stored in the storage unit 63 as the key information 63B. In a case that the key information received from the electronic key 10 is stored in the storage unit 63 as the key information 63B, the electronic key deleting unit 65F deletes the key information received from the electronic key 10 from the storage unit 63 and ends the invalidation mode. In a case that the execution key Kt(m) is authenticated as being regular by the execution key comparing unit 65B and the two pieces of key information (or key tag information) are determined to match each other by the existing electronic key determining unit 65C, the electronic key deleting unit 65F may execute the invalidation mode in response to the invalidation request for the registration mode from the diagnostic device 30.

In a case that the two pieces of key information (or key tag information) are determined not to match each other by the existing electronic key determining unit 65C, the electronic key deleting unit 65F executes the invalidation process at the second time.

Sequence Diagram

Figure 6:
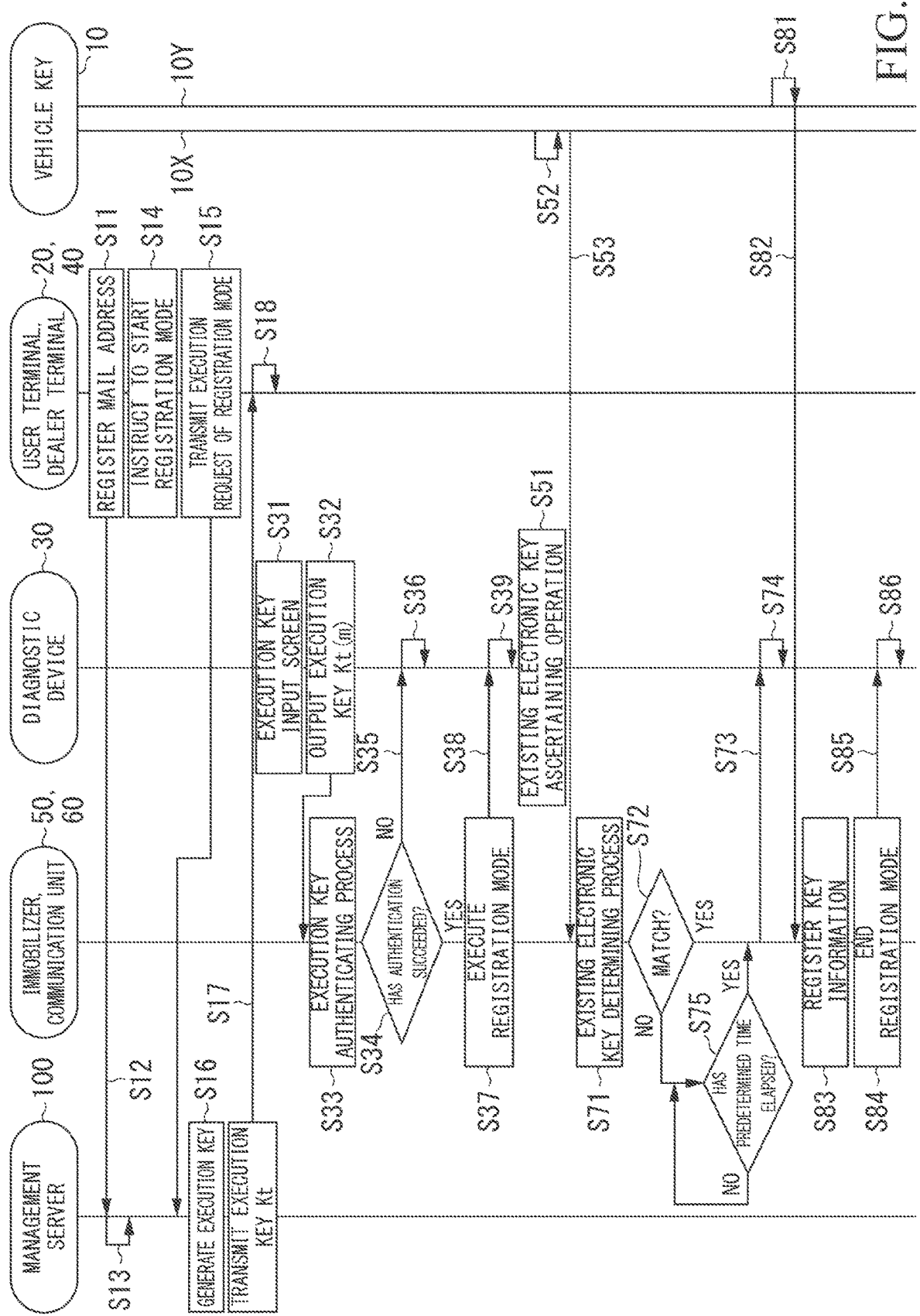
FIG. 6 is a sequence diagram showing an example of a process flow which is performed by the electronic key management system.

FIG. 6 is a sequence diagram showing an example of a process flow which is performed by the electronic key management system 1 according to the first embodiment. An example in which the registration mode is executed will be described below. First, a salesperson B operates the dealer terminal 40 to perform an operation of registering a dealer mail address in the management server 100 (Step S11). Accordingly, the dealer terminal 40 transmits the input dealer mail address to the management server 100 (Step S12). The management server 100 stores the received dealer mail address in the storage unit 130 (Step S13). Similarly, a qualified owner A may also register a user mail address in advance in the management server 100 by transmitting the user mail address from the user terminal 20 to the management server 100.

Subsequently, the salesperson B operates the dealer terminal 40 to instruct to start execution of the registration mode (Step S14). Here, the salesperson B inputs a vehicle number. In a case that the instruction to start execution of the registration mode is received, the dealer terminal 40 transmits an execution request for the registration mode to the management server 100 (Step S15). In a case that the execution request for the registration mode is received, the management server 100 generates an execution key K on the basis of the vehicle number or date, time information, or the like (Step S16).

The management server 100 transmits an execution key Kt which is the execution key generated in Step S16 to the dealer terminal 40 (Step S17). The dealer terminal 40 displays the received execution key Kt on the display unit thereof (Step S18). Although not illustrated, the management server 100 transmits an execution key Kd which is the execution key K generated in Step S16 to the diagnostic device 30 and transmits an execution key Ki which is the execution key K generated in Step S16 to the immobilizer 60.

Subsequently, the salesperson B operates the input unit 32 of the diagnostic device 30 to display an input screen for receiving an input of an execution key (hereinafter referred to as an execution key input screen) on the display unit 33 (Step S31). An input box for information required for authentication as information other than the execution key may be provided on the execution key input screen. The diagnostic device 30 outputs the execution key Kt(m) input to the input unit 32 by the salesperson B to the immobilizer 60 (Step S32).

The immobilizer 60 performs a process of authenticating the execution key on the basis of the execution key Kt(m) input from the diagnostic device 30. In a case that the authentication has failed (Step S34), the immobilizer 60 outputs information indicating that the authentication has failed to the diagnostic device 30 (Step S35) and the diagnostic device 30 displays a screen indicating that the authentication has failed on the display unit 33 on the basis of the input information (Step S36).

On the other hand, in a case that the authentication has succeeded in Step S34, the immobilizer 60 executes the registration mode (Step S37) and outputs information indicating that the registration mode is being executed (or that the authentication of the execution key has succeeded) to the diagnostic device 30 (Step S38). The diagnostic device 30 displays a screen indicating that the registration mode is being executed (or that the authentication of the execution key has succeeded) on the display unit 33 on the basis of the input information (Step S39). Here, the immobilizer 60 may display an existing electronic key ascertaining operation on the diagnostic device 30 along with the above-mentioned details. The existing electronic key ascertaining operation includes an operation of operating a switch of an existing electronic key or an operation of inputting key tag information displayed in a key tag of the existing electronic key to the diagnostic device 30. Accordingly, for example, the salesperson B operates the switch of the existing electronic key 10X (Step S52). The existing electronic key 10X transmits key information stored therein (Step S53).

Subsequently, the immobilizer 60 performs an existing electronic, key determining process (Step S71).

This existing electronic key determining process will be described later in detail. In a case that it is determined in the existing electronic key determining process that the two pieces of key information (or key, tag information) match each other (Step S72), the immobilizer 60 outputs information indicating that a new electronic key 10Y can be registered to the diagnostic device 30 (Step S73). The diagnostic device 30 displays a screen indicating that a new electronic key 10Y can be registered on the display unit 33 on the basis of the input information (Step S74).

On the other hand, in a case that it is determined in Step S72 that the two pieces of key information (or key tag information) do not match each other, the immobilizer 60 waits until a predetermined waiting time elapses (Step S75). In a case that the predetermined waiting time has elapsed, the immobilizer 60 performs the processes of Step S73 and steps subsequent thereto.

Subsequently, in a case that the screen displayed in Step S74 has been ascertained, the salesperson B operates the switch of the new electronic key 10Y (Step S81). In response to the operation from the salesperson B, the new electronic key 10Y transmits key information stored therein (Step S82). In a case that key information is received from the electronic key 10Y, the immobilizer 60 executes the registration process. That is, the immobilizer 60 stores the received key information as the key information 63B in the storage unit 63 (Step S83) and ends the registration mode (Step S84). Subsequently, the immobilizer 60 transmits information indicating, that the key information has registered to the diagnostic device 30 (Step S85) and the diagnostic device 30 displays the received information on the display unit 33 (Step S86).

In a case that the invalidation mode is executed, the same processes as described above are performed. The existing electronic key determining process (Step S71) is performed after the execution key authenticating process (Step S33), but this order may be reversed. The process of Step S83 corresponds to the step of "executing the registration process or the invalidation process" which is described in the claims.

In the sequence, the dealer terminal 40 transmits the execution request, but the diagnostic device 30 may transmits the execution request to the management server 100 via the immobilizer 60 (Case 1). In a case that the communication unit 50 is out of order or a communication environment is not good, the diagnostic device 30 may directly transmit the execution request to the management server 100 (Case 2). In Case 1, the management server 100 transmits an execution key Ki to the immobilizer 60. The immobilizer 60 may perform the process of authenticating the execution key by comparing the execution key Ki with the execution key Kt(m) input from the diagnostic device 30. In Case 2, the management server 100 transmits the execution key Kd to the diagnostic device 30. The immobilizer 60 may perform the process of authenticating the execution key by comparing the execution key Kt(m) with the execution key Kd input from the diagnostic device 30.

The electronic key registering unit 65D or the electronic key deleting unit 65F may perform execute the registration process in a case that the execution key Kt(m) has not been authenticated as being regular by the execution key comparing unit 65B but the two pieces of key information (or key tag information) has been determined to match each other by the existing electronic key determining unit 65C. Accordingly, for example, in a case that the registration mode or the like is requested in a situation in which the vehicle 70 cannot move from a place in which a communication environment with the network is not good such as an underground parking lot and the two pieces of key information (or key tag information) has been determined to match each other by the existing electronic key determining unit 65C, it is possible to execute the registration process or the like.

Figure 7:
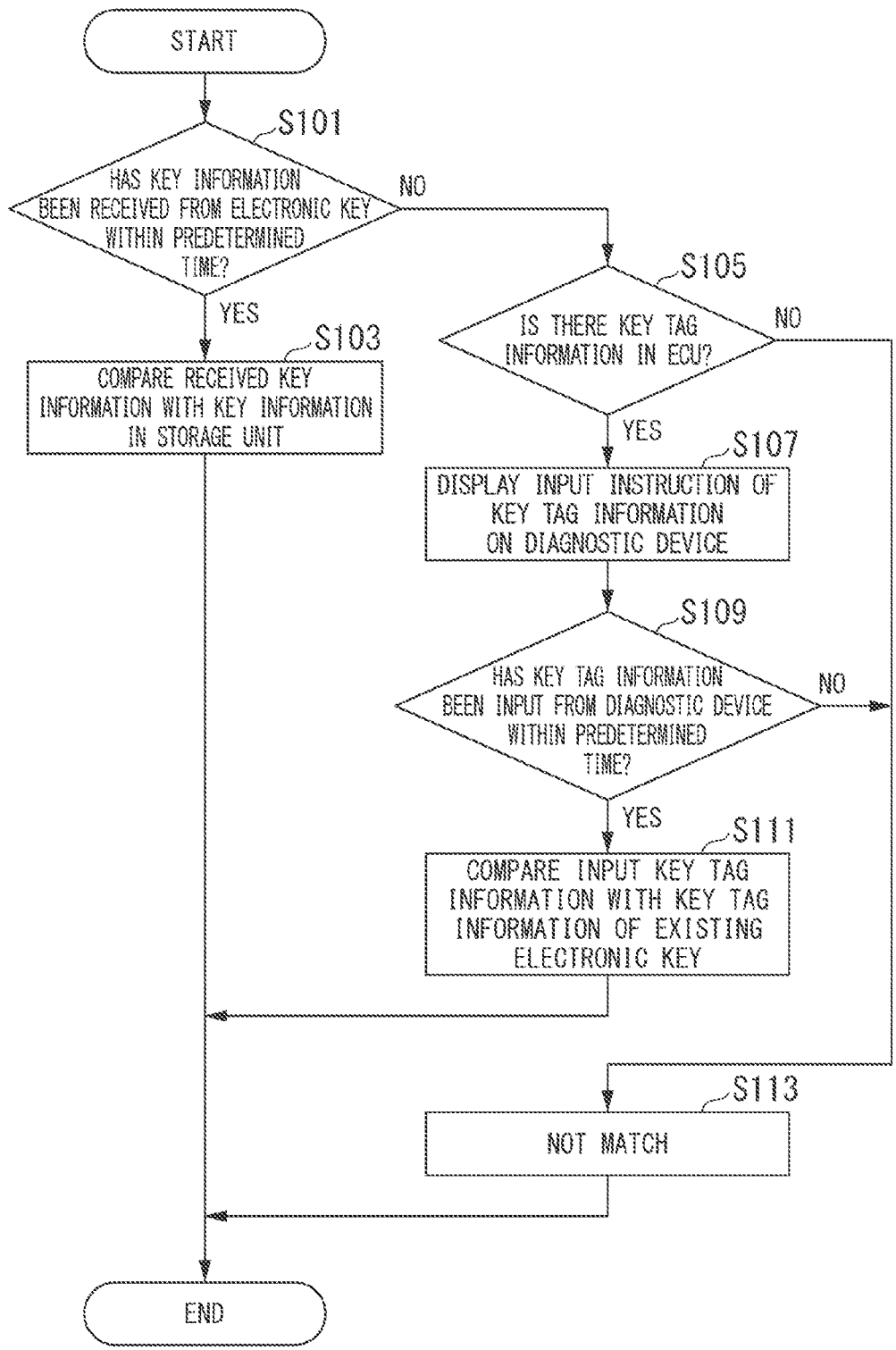
FIG. 7 is a flowchart showing an example of a process flow of an existing electronic key determining process.

An example of the existing electronic key determining process will be described below with reference to FIG. 7. FIG. 7 is a flowchart showing an example of a flow of the existing electronic key determining process. First, the existing electronic key determining unit 65C determines whether key information has been received from the electronic key 10X within a predetermined time (Step S101). In a case that the key information has been received within the predetermined time, the existing electronic key determining unit 65C compares the received key information with the key information 63B in the storage unit 63 (Step S103). In a case that key information matching the received key information is included in the key information 63B in the storage unit 63 as the result of comparison, a process of registering (or invalidating) the key information is performed immediately. On the other hand, in a case that key information matching the received key information is not included in the key information 63B in the storage unit 63, the process of registering (invalidating) the key information is not executed before a waiting time elapses.

In a case that key information has not been received within the predetermined time in Step S101, the existing electronic key determining unit 65C determines whether key tag information is registered in the ECU 71 (Step S105). In a case that key tag information is registered, the key tag information is read from the storage unit 73 and is temporarily stored in the storage unit 63. Subsequently, the existing electronic key determining unit 65C displays a screen indicating an input of key tag information on the diagnostic device 30 (Step S107). Then, the existing electronic key determining unit 65C determines whether key tag information has been input from the diagnostic device 30 within a predetermined time (Step S109).

In a case that key tag information has been input within the predetermined time, the existing electronic key determining unit 65C compares the input key tag information with the key tag information temporarily stored in the storage unit 63 (Step S111). In a case that key tag information matching the input key tag information is included in the key tag information 73A in the storage unit 73 of the ECU 71, the process of registering (or invalidating) the key information is performed immediately. On the other hand, in a case that key tag information matching the input key tag information is not included in the key tag information 73A in the storage unit 73 of the ECU 71, the process of registering (or invalidating) the key information is not performed before the waiting time has elapsed.

In a case that the determination result of Step S105 or S109 is negative, the existing electronic key determining unit 65C determines that the two pieces of key information (or key tag information) do not match each other (Step S113).

With the onboard authentication device according to this embodiment, since the onboard authentication device includes the communication unit 62 that receives key information from an electronic key 10, the existing electronic key determining unit 65C that determines whether the key information received by the communication unit 62 matches key information of an existing electronic key 10X registered already in association with a vehicle 70, and the execution unit (the electronic key registering unit 65D and the electronic key deleting unit 65F) that executes the registration process of registering a new electronic key 10Y in the immobilizer 60 or the invalidation process of invalidating the existing electronic key 10X registered in the immobilizer 60 at a first time in a case that the existing electronic key determining unit 65C determines that the received key information matches the key information of the existing electronic key 10X and executes the registration process or the invalidation process at a second time later than the first time in a case that the existing electronic key determining unit 65C determines that the received key information does not match the key information of the existing electronic key 10X, it is possible to execute the registration process or the invalidation process at the second time even in a case that there is no existing electronic key 10X. Accordingly, it is possible to perform a predetermined process associated with authentication of an electronic key while maintaining security of the vehicle by performing the process of ascertaining the existing electronic key 10X.

Second Embodiment

An electronic key management system according to a second embodiment can be embodied by the same configuration as the electronic key management system 1 according to the first embodiment. Only differences from the first embodiment will be described below using the same names and reference signs as the elements included in the electronic key management system 1 according to the first embodiment.

Figure 8:
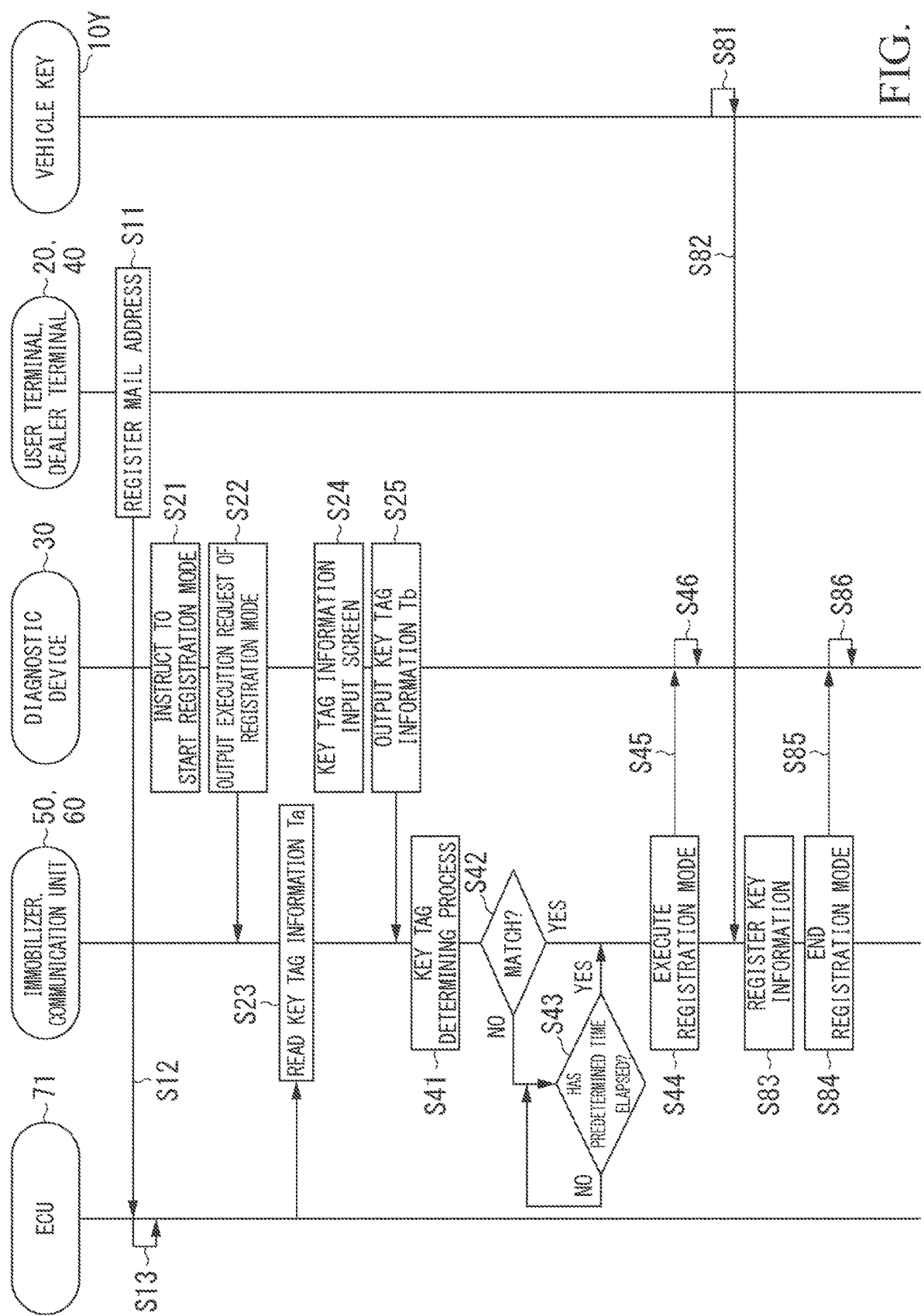
FIG. 8 is a sequence diagram showing an example of a process flow which is performed by an electronic key management system according to a second embodiment.

FIG. 8 is a sequence diagram, showing an example of a process flow which is performed by the electronic key management system 1 according to the second embodiment. The same processes as illustrated in FIG. 6 will be referred to by the same reference signs and detailed description thereof will not be repeated.

A salesperson B operates the diagnostic device 30 to instruct to start execution of the registration mode (Step S21). In a case that the instruction to start execution of the registration mode is received, the diagnostic device 30 outputs an execution request for the registration mode to the immobilizer 60 (Step S22). In a case that the execution request for the registration mode is input, the immobilizer 60 reads key tag information Ta from the storage unit 73 of the ECU 71. (Step S23). Subsequently, the diagnostic device 30 displays an input screen for inputting key tag information (hereinafter referred to as a key tag input screen) on the display unit 33 (Step S24). The diagnostic device 30 outputs key tag information Tb input to the input unit 32 by the salesperson B to the immobilizer 60 (Step S25).

Subsequently, the immobilizer 60 performs an existing electronic key determining process using the key tag information (Step S41). That is, the existing electronic key determining unit 65C compares the key tag information Ta read in Step S23 with the key tag information Tb input in Step S25. In a case that the key tag information Ta and the key tag information Tb do not match each other as the result of comparison, the immobilizer 60 waits until a predetermined waiting time elapses (Step S43). In a case that the predetermined waiting time has elapsed or in a case that the key tag, information Ta and the key tag information Tb match each other in Step S42, the immobilizer 60 executes the registration mode (Step S44) and outputs information indicating that the registration mode is being executed (or that the authentication of the key tag information has succeeded) to the diagnostic device 30 (Step S45). The diagnostic device 30 displays a screen indicating the registration mode is being executed (or that the authentication of the key tag information has succeeded) on the display unit 33 (Step S46).

The part associated with the key tag determination may be replaced with key information determination.

In the second embodiment, the same advantages as in the first embodiment can be expected.

The embodiment can be expressed as follows:
An onboard authentication device including:
a communication unit configured to receive key information from an electronic key;
a storage device; and
a hardware processor configured to execute a program stored in the storage device,
wherein, the hardware processor is configured, by executing the program, to determine whether the key information received by the communication unit matches key information of a first electronic key registered already in association with a vehicle,
to execute a registration process of registering a second electronic key in the onboard authentication device or an invalidation process of invalidating the first electronic key registered in the onboard authentication device at a first time in a case that it is determined that the received key information matches the key information of the first electronic key, and
to execute the registration process or the invalidation process at a second time later than the first time in a case that it is determined that the received key information does not match the key information of the first electronic key.

While embodiments of the invention have been described above, the invention is not limited to the embodiments and can be subjected to various modifications and substitutions without departing from the gist of the invention.

For example, "the registration process or the invalidation process is executed in the immobilizer 60" means that the processes are settled to be valid. In a case that the key information received from the electronic key 10 in the existing electronic key determining process does not match the key information of the existing electronic key (or in a case that the key tag information input from the diagnostic device 30 does not match the key tag information of the existing electronic key stored in the ECU 71), the immobilizer 60 may immediately perform a preparation process which is included as a part of the registration process or the invalidation process and perform the rest settlement process (that is, the process of settling the processes to be valid) after a predetermined waiting time has elapsed. The preparation process includes, for example, processes of receiving key information from the electronic key 10, writing the received key information to the storage unit 63, and assigning an in-preparation flag to the key information. Accordingly, the immobilizer 60 can store the stored key information as information which is not used for the authentication process or the like in the storage unit 63. The settlement process includes a process of rewriting the in-preparation flag assigned to the key information with a settlement flag. Accordingly, the key information to which the settlement flag is assigned is handled as regularly registered (or invalidated) information by the immobilizer 60.

The existing electronic key determining unit 65C may perform both the key information determination and the key tag determination, execute the registration process or the invalidation process in a case that the results of both the determinations are positive, and execute the registration process or the invalidation process after a predetermined waiting time has elapsed in a case that at least one of the results of both the determinations is negative. In this process, since the existing electronic key determining unit 65C requires a person who intends to execute the registration process or the invalidation process to input both the key information and the key tag information of the existing electronic key, it is possible to further improve security of a vehicle.

The immobilizer 60 can perform the key information determination (or the key tag determination) even before the waiting time has elapsed. In a case that the result of the key information determination (or the key tag determination) is positive while waiting for elapse of the waiting time, the electronic key registering unit 65D or the electronic key deleting unit 65F of the immobilizer 60 may execute the registration process or the invalidation process immediately.

In a case that the result of the key information determination (or the key tag determination) is negative, the electronic key registering unit 65D or the electronic key deleting unit 65F of the immobilizer 60 may shorten the waiting time by performing another authentication process. For example, in a case that authentication in an authentication process based on an ID and a password which are set by the qualified owner A or an authentication process based on an execution key has succeeded, the waiting time may be shortened. In a case that the result of the key information determination is negative and the result of the key tag determination is positive, the waiting time may be shortened. The shortening of the waiting time may be to shorten the waiting time at a predetermined proportion (such as half or one-third) or may be to shorten the waiting time by a predetermined time. The time of the proportion (or length) may be shortened depending on the number of times of success in authentication.

In a case that the result of the key information determination (or the key tag determination) is negative or in a case that the authentication process has failed, the immobilizer 60 may notify the management server 100 of that fact.

The communication control unit 154 may cause the qualified owner A or the salesperson B to verify identity before transmitting an execution key. For example, the communication control unit 154 transmits ascertainment information for ascertaining whether execution of the registration process or the invalidation process of the electronic key 10 is to be permitted for the vehicle 70 to the dealer terminal 40 or the user terminal 20. The ascertainment information may include the vehicle number of the vehicle 70 or a date and time at which the request has been transmitted. In the dealer terminal 40 or the user terminal 20, an ascertainment screen based on the ascertainment information is displayed and permission/non-permission button for inputting whether execution of the registration process or the invalidation process is to be permitted is displayed on the ascertainment screen. The dealer terminal 40 or the user terminal 20 transmits operation details of the permission/non-permission button to the management server 100. In a case that information indicating that the permission button has been operated is received from the dealer terminal 40 or the user terminal 20, the communication control unit 154 transmits the execution key Ki to the immobilizer 60 or the like, transmits the execution key Kt to the dealer terminal 40 or the user terminal 20, and transmits the execution key Kd to the diagnostic device 30.

The electronic key 10 may be replaced with a card key, a user terminal 20, or the like. In case of a card key; the immobilizer 60 receives key information from the card key using a card reader provided in the vehicle 70. In case of a user terminal 20, the immobilizer 60 receives key information from the user terminal 20 using the communication unit 50 or a radio communication device (for example, a Bluetooth (registered trademark) unit) provided in the vehicle 70.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An onboard authentication device comprising:
    a processor; and
    a memory that stores instructions that, when executed by the processor, facilitates performance of operations, comprising:
    connecting to a diagnostic device;
    determining whether a first execution key entered from the diagnostic device matches a second execution key registered already in association with a vehicle;
    communicating with an electronic key;
    receiving key information sent from the electronic key in response to an operation of the electronic key;
    determining whether the key information matches key information of the first electronic key registered already in association with a vehicle; and
    executing a registration process of storing key information of a second electronic key, which is different from the first electronic key in a storage device of the onboard authentication device and an invalidation process of deleting key information of the first electronic key registered in the onboard authentication device from the storage device at a first time in a case of determining that the first execution key matches the second execution key and determining that the received key information matches the key information of the first electronic key; and
    executing the registration process or the invalidation process at a second time later than the first time in a case of determining that the first execution key matches the second execution key and determining that the received key information does not match the key information of the first electronic key.

2. The onboard authentication device according to claim 1, wherein the operations further comprise,
    determining whether information input from external device matches electronic key identification information which is stored in the storage device provided in the vehicle and which is identification information of the first electronic key which is different from the key information in a case of not receiving key information within a predetermined period, and
    executing the registration process or the invalidation process at the first time in a case of determining that the information input from the external device matches the electronic key identification information and executing the registration process or the invalidation process at the second time in a case of determining that the information input from the external device does not match the electronic key identification information.

3. The onboard authentication device according to claim 2, wherein the electronic key identification information is information which is provided to a qualified owner at the time of purchase of the first electronic key.

4. The onboard authentication device according to claim 1, wherein the operations further comprise: executing the registration process or the invalidation process in a case that a regular execution key is acquired as an execution key for transitioning to a registration mode in which the registration process is executed or an invalidation mode in which the invalidation process is executed.

5. The onboard authentication device according to claim 1, wherein the second time is a time when at least one hour or more has passed since performance of a determination.

6. The onboard authentication device according to claim 1, wherein
  the first execution key and the second execution key are generated by a management server device that is different from the onboard authentication device and the diagnostic device, and
  the management server device generates the first execution key and the second execution key in response to an execution request received from the onboard authentication device, and sends the second execution key to the onboard authentication device and to the diagnostic device.

7. An authentication method of causing a computer that communicates with an electronic key and receives key information from the electronic key in response to an operation of the electronic key to perform:
  determining whether a first execution key entered from a diagnostic device matches a second execution key registered already in association with a vehicle;
  determining whether the key information is received from the electronic key within a predetermined time and whether the key information matches key information of a first electronic key registered already in association with a vehicle; and
  executing a registration process of storing key information of a second electronic key which is different from the first electronic key in a storage device of the onboard authentication device and an invalidation process of deleting key information of the first electronic key registered in the onboard authentication device from the storage device at a first time in a case that the first execution matches the second execution key and that it is determined that the received key information matches the key information of the first electronic key; and
  executing the registration process or the invalidation process at a second time later than the first time in a case that the first execution key matches the second execution key and that it is determined that the received key information does not match the key information of the first electronic key.

8. A non-transitory computer-readable storage medium having a program stored therein, the program causing a computer that communicates with an electronic key and receives key information from the electronic key in response to an operation of the electronic key to perform:
  determining whether a first execution key entered from a diagnostic device matches a second execution key registered already in association with a vehicle;
  determining whether the key information is received from the electronic key within a predetermined time and whether the key information matches key information of a first electronic key registered already in association with a vehicle;
  executing a registration process of storing key information of a second electronic key which is different from the first electronic key, in a storage device of the onboard authentication device and an invalidation process of deleting key information of the first electronic key registered in the onboard authentication device from the storage device at a first time in a case that the first execution key matches the second execution key and that it is determined that the received key information matches the key information of the first electronic key; and
  executing the registration process or the invalidation process at a second time later than the first time in a case that the first execution key matches a second execution key and that it is determined that the received key information does not match the key information of the first electronic key.

* * * * *